June 26, 1934.  F. T. ROBERTS  1,964,008
RUBBER BALL
Filed Dec. 26, 1930    2 Sheets-Sheet 1
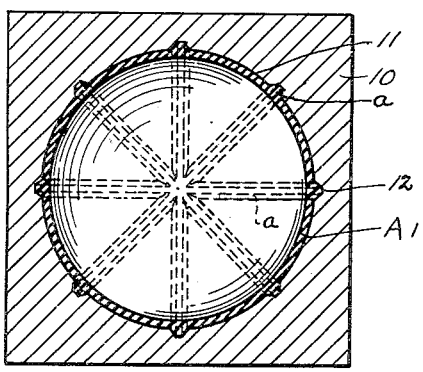
FIG-1
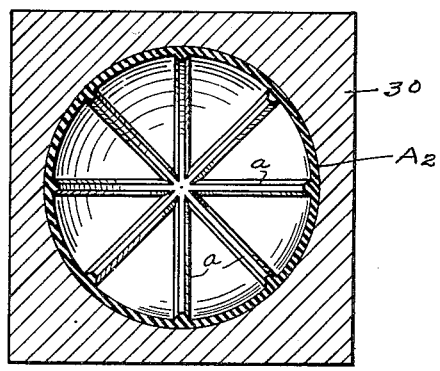
FIG-4
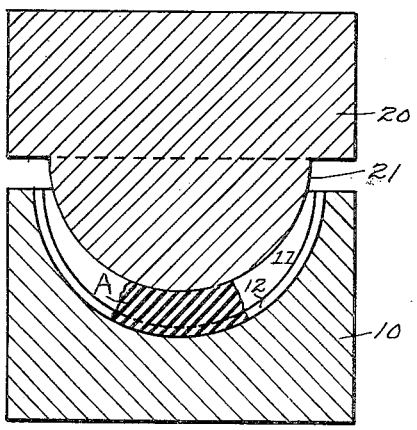
FIG-2
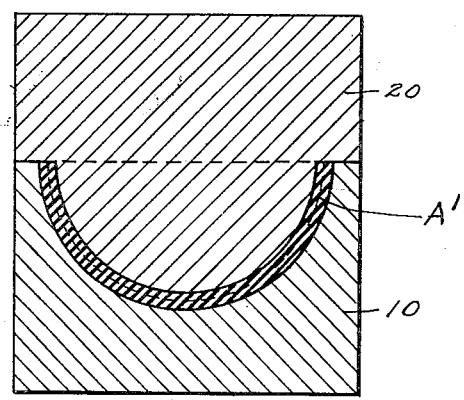
FIG-3
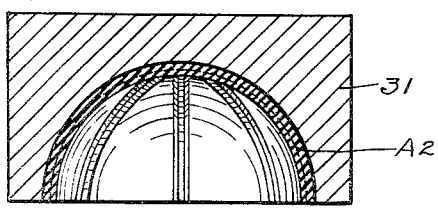
FIG-5
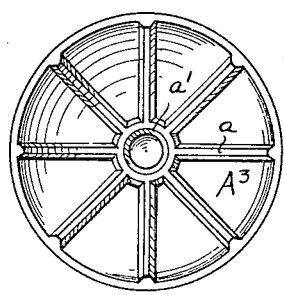
FIG-6
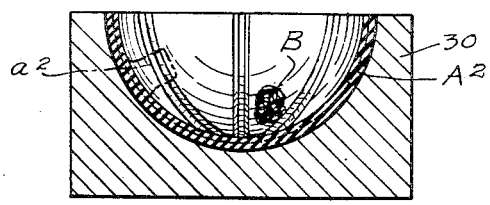
Inventor
Fred Thomas Roberts
By Baker, Golrick & Fearn
Attorneys.

June 26, 1934.  F. T. ROBERTS  1,964,008
RUBBER BALL
Filed Dec. 26, 1930  2 Sheets-Sheet 2

Inventor
Fred Thomas Roberts
By Bates, Goldrick & Fear
Attorneys

Patented June 26, 1934

1,964,008

UNITED STATES PATENT OFFICE 1,964,008

RUBBER BALL

Fred Thomas Roberts, Paterson, N. J., assignor to The Hamilton Trust Company, Paterson, N. J., a corporation of New Jersey Application December 26, 1930, Serial No. 504,767

7 Claims. (Cl. 273—58)

One of the objects of this invention is to provide a hollow rubber ball which shall have considerable resistance to compression without requiring a high air pressure within it.

It is a characteristic of my ball that it has within it suitable ribs tending to resist outside compression of the ball. In the method of manufacture, I first make the sections of the ball with the ribs on the outside and then turn such sections inside out, which compresses the ribs, strengthening them and giving them greater resistance to external forces tending to collapse the ball.

Figure 7:
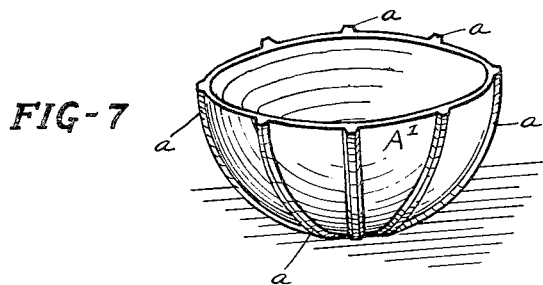
Figure 8:
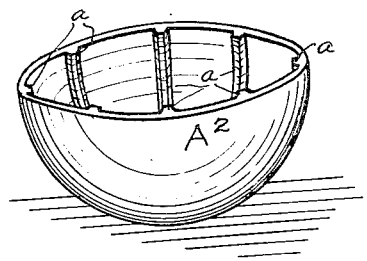
Figure 9:
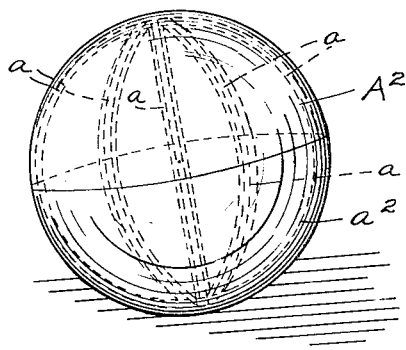
Figure 10:
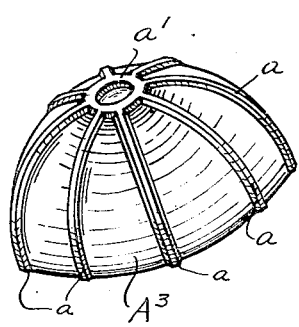

In the drawings, Fig. 1 is a sectional plan of a cavitary mould member in which half of my ball may be formed; Fig. 2 is a vertical section through such mould member in cooperation with the complementary member, showing the position as the members begin to act; Fig. 3 is a view of the two members of the mould after they have been brought together forming one of the halves; Fig. 4 is a section of one of the vulcanizing mould members, shown as containing the product of the moulds of Figs. 1, 2 and 3, turned inside out; Fig. 5 is a vertical section through the two members of such vulcanizing mould with the two introverted rubber halves in place therein; Fig. 6 is a view of one of the rubber half-sections, in somewhat modified form, as it is placed in the vulcanizing mould; Fig. 7 is a perspective of one of the half sections as formed; Fig. 8 is a perspective of the same section after it has been turned inside out; Fig. 9 is a perspective of the complete ball; Fig. 10 is a perspective of the modified form of Fig. 6 as originally formed and before it has been turned.

In Figs. 1, 2 and 3, 10 indicates a cavitary forming mould having a stationary hemispherical cavity 11 with additional meridian cavities 12 for forming the ribs. These meridian cavities may come to a pole as indicated in Fig. 1 or they may terminate in a circular cavity surrounding the theoretic pole. 20 in Figs. 2 and 3 indicates the complementary mould member, having a plain hemispherical projection 21.

A, in Fig. 2, indicates a block of raw rubber adapted to be given the cup-like form of Fig. 7 by pressure of the mould members together. When these mould members have been thus brought together, the block of rubber fills the cavity as shown at A1 in Fig. 3. When this has been accomplished, the suitable heating of the moulds semi-cures this section; then when the moulds are separated and the article removed it comprises a hollow hemisphere as shown in Figs. 7 or 9 having external meridian ribs $a$. This hemisphere is now turned inside out, or "introverted", thus giving a smooth external hemispherical wall shown at A2 in Fig. 8 and the interior meridian ribs $a$, which, by this turning action are compressed into a smaller space and thus are strengthened and made stiffer.

Two halves, such as shown in Fig. 8, may now be placed in two vulcanizing mould members 30 and 31, which are blocks having hemispherical cavities, and suitable cement may be applied to the diametric edges of the halves. Either before or after this placement the halves may be coated with a solution which on vulcanization will render them more impervious to air. The mould members are now brought together and suitable heat is applied to complete the vulcanization.

If desired, an internal pneumatic pressure may be obtained during vulcanization, as for instance, by placing in the lower section A2 a pill B or any suitable quantity of a chemical, which, under heat, will react with a suitable quantity of water to produce an internal gas, or the sections may be brought together in atmosphere of compressed air, both of which methods of obtaining internal pressure are well understood. After vulcanization, when the ball is removed from the mould, it has the form shown at A2 in Fig. 9.

If it is desired to avoid an aggregation of ribs at the poles tending to make the ball unduly stiff at that point, the forming mould may be so grooved as to provide a small circular rib $a1$ about the pole, at which the meridian ribs $a$ terminate, as shown in Fig. 10; when such section, designated A3, is turned inside out, it has the form shown in Fig. 6.

Whichever form of construction is employed, it should be noticed that the two halves are placed in the vulcanizing mould with the ribs in mutual registration, so that when the halves are joined there will be a continuous rib from one pole or a region near it, to the other, as indicated in Fig. 9. This location of the halves may be assisted by suitable indicating marks on the face of the vulcanizing mould sections 30 and 31.

As so far described, I have effected a butt seam of the two halves. However, in place of this, I may, if desired, join them by a bevel seam, one of the two halves being died out with an inward bevel and the other with an outward bevel, after the manner of my Patent No. 1,151,396 of August 24th, 1915.

An advantage of this ball is that the ribs act as compressed springs and give the necessary resiliency without high pressure of air inside the ball; in fact, the finished ball, if desired, may have no internal pneumatic pressure to hold it and rely entirely on the outward action of the spring ribs. Or it may have a low pressure, provided by nitrogen or other gas made from the inflating chemical inserted and vaporized at vulcanization, or the ball may be inflated in the old manner after completion by a hypodermic needle projected through the wall. In that case a suitable internal block of para rubber may be employed to seal the opening, such block being indicated by the broken line $a2$ in Fig. 5.

I claim:—

1. A hollow rubber ball having internal rubber ribs compressed to a greater extent than the wall of the ball.

2. A hollow rubber ball having internal rubber ribs integral with the wall of the ball but compressed to a greater extent than the wall of the ball.

3. A hollow rubber ball having on its interior, meridian ribs leading from a point adjacent one pole to a point adjacent the opposite pole, said ribs being under compressive stress, the stress in a rib increasing from a lower value near the wall to a higher value at the inner periphery of the rib.

4. A hollow rubber ball having on the interior a pair of circular ribs around the poles, and meridian ribs leading from one polar circle to the other, all of said ribs being integral with the walls of the ball, and the meridian ribs being in greater compression than the walls of the ball.

5. A hollow ball, having rubber walls, the internal portion of the walls being compressed to a greater extent than the external portion of the walls.

6. A thin-walled, hollow, rubber ball, having resiliency independently of internal fluid pressure, and having the outer portion of the wall in greater tension than the inner portion of the wall.

7. A hollow rubber ball having in its interior circular ribs in the position of parallels of latitude and ribs extending at an angle thereto, the latter ribs being under longitudinal compression and serving to support the ball surface at regular intervals.

FRED THOMAS ROBERTS.